US009849526B2

(12) United States Patent
Yoshizumi et al.

(10) Patent No.: US 9,849,526 B2
(45) Date of Patent: Dec. 26, 2017

(54) BROACH (71) Applicant: MITSUBISHI MATERIALS CORPORATION, Tokyo (JP)

(72) Inventors: Naoki Yoshizumi, Akashi (JP); Yoshio Kobayashi, Akashi (JP); Kensuke Kohno, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 110 days.

(21) Appl. No.: 14/227,284

(22) Filed: Mar. 27, 2014

(65) Prior Publication Data
US 2014/0294521 A1    Oct. 2, 2014

(30) Foreign Application Priority Data
Mar. 29, 2013    (JP) .................................. 2013-070820

(51) Int. Cl.
*B23D 43/00*    (2006.01)
*B23D 43/06*    (2006.01)
*B23D 37/00*    (2006.01)

(52) U.S. Cl.
CPC .......... *B23D 43/005* (2013.01); *B23D 37/00* (2013.01); *B23D 43/06* (2013.01); *Y10T 407/16* (2015.01); *Y10T 407/1671* (2015.01)

(58) Field of Classification Search
CPC ............. Y10T 407/16; Y10T 407/1614; Y10T 407/1628; Y10T 407/1642;
(Continued)

(56) References Cited

U.S. PATENT DOCUMENTS 1,028,824 A * 6/1912 La Pointe .............. B23D 37/04
                                                       409/259
1,935,774 A * 11/1933 Halborg ................. B23D 43/02
                                                       407/16
(Continued)

FOREIGN PATENT DOCUMENTS

DE      2049868 A1 *  7/1971  ............. B23D 37/16
GB       403128 A  * 12/1933  ............. B23D 43/02
(Continued)

OTHER PUBLICATIONS

Japanese Patent Office, Notice of Reasons for Rejection dated Aug. 2, 2016, issued on corresponding Japanese Patent Application No. 2013-070820.

Primary Examiner — Daniel Howell
Assistant Examiner — Nicole N Ramos
(74) Attorney, Agent, or Firm — Locke Lord LLP; Howard M. Gitten (57) ABSTRACT

A plurality of cutting edges that are arranged on an outer circumference of a shaft-shaped broach body are provided with a spline teeth group, which contains a plurality of spline teeth 8 that groove a prepared hole of a work material, and a round teeth group, which is disposed in a different position from the spline teeth group along an axis direction and contains a plurality of round teeth that machine an inner circumference of the prepared hole. At least one gullet is formed to extend along the outer circumference of the broach body in a circumferential direction around the axis between the round teeth that are adjacent to one another in the axis direction in the round teeth group. The gullet extends toward the axis direction, gradually twisting toward the circumferential direction. The spline teeth group and the round teeth group are formed integrally on the outer circumference of the broach body.

5 Claims, 4 Drawing Sheets (58) Field of Classification Search
CPC ......... Y10T 407/1657; Y10T 407/1671; Y10T 407/1685; Y10T 409/40; Y10T 409/4028; B23F 21/24; B23F 21/241; B23F 21/243; B23F 21/245; B23F 21/246; B23F 21/248; B23F 21/26; B23F 21/262; B23F 21/264; B23F 21/266; B23D 43/00; B23D 43/005; B23D 43/02; B23D 43/04; B23D 43/06; B23D 2043/025; B23D 2043/063; B23D 37/00; B23D 37/02; B23D 37/04; B23D 37/08; B23D 37/10; B23D 37/14; B23D 37/16
USPC ...................................... 407/13–19; 409/259
See application file for complete search history.

(56) References Cited

U.S. PATENT DOCUMENTS

| | | | | | |
|---|---|---|---|---|---|
| 2,060,889 | A | * | 11/1936 | Nilsson | B23D 43/005 407/18 |
| 2,140,146 | A | * | 12/1938 | Tautz | B23D 43/02 407/18 |
| 2,256,573 | A | * | 9/1941 | Phaneuf | B23D 43/02 407/18 |
| 2,292,900 | A | * | 8/1942 | Schmidt | B23D 43/02 407/1 |
| 2,320,787 | A | * | 6/1943 | Mentley | B23D 43/02 407/13 |
| 2,392,172 | A | * | 1/1946 | Markstrum | B23D 43/02 407/18 |
| 3,178,800 | A | * | 4/1965 | Psenka | B23D 43/00 407/16 |
| 3,439,398 | A | * | 4/1969 | Jacobson | B23D 43/02 407/16 |

FOREIGN PATENT DOCUMENTS

| | | | | |
|---|---|---|---|---|
| GB | 1136972 A | * | 12/1968 | ............. B23D 43/02 |
| JP | H3-100016 | | 10/1991 | |
| JP | 3377713 B2 | | 2/2003 | |
| JP | 2008229743 A | | 10/2008 | |

* cited by examiner

BROACH

BACKGROUND OF THE INVENTION

Field of the Invention

The present invention relates to a broach in which a plurality of cutting edges are formed on a broach body. The cutting edges of the broach are inserted, together with the broach body, into a prepared hole formed in a work material, in order, to form the prepared hole in a predetermined shape such as an internal gear shape using grooving or machining of the inner circumference.

Priority is claimed on Japanese Patent Application No. 2013-070820, filed on Mar. 29, 2013, the content of which is incorporated herein by reference.

Description of Related Art

As such a broach of the related art, there is known a broach that is provided with a shaft-shaped broach body and a plurality of cutting edges that are arranged on an outer circumference of the broach body spaced apart at intervals in an axial direction of the broach body. The broach body is inserted into a prepared hole that is formed in the work material facing a tool feed direction along the axial direction. At this time, the plurality of cutting edges groove the prepared hole and machine the inner circumference of the prepared hole, thereby cutting the prepared hole into a predetermined shape such as an internal gear shape.

For example, in the helical broach disclosed in Japanese Patent No. 3377713, the broach body is of an assembly type in which the broach body is configured to have a shaft-shaped body section, which includes a larger-diameter section and a smaller-diameter section that are adjacent to one another in the axial direction, and a cylindrical shell section. The shell section is mounted in a removable manner onto the smaller-diameter section that is positioned on a rear portion of the body section. In a state in which the body section and the shell section are assembled, the plurality of cutting edges form rows along the outer circumference of the larger-diameter section and the outer circumference of the shell section in the body section.

The cutting edges are provided with a spline teeth group, which contains a plurality of spline teeth that groove a prepared hole of the work material, and a round teeth group, which contains a plurality of round teeth that machine the inner circumference of the prepared hole. In the case of a broach with rear round teeth, the round teeth group is entirely disposed on the shell section, closer to the rear in the tool feed direction than the spline teeth group.

With such a broach with rear round teeth, it is possible to reduce the interval between cutting edges (between the spline teeth or between the round teeth) of the same type that are adjacent to one another in the axial direction in comparison to an alternate round teeth type of broach (a broach in which the spline teeth and the round teeth are disposed alternately in the axial direction). In particular, even when the length of the work material along the axial direction is short (that is, the thickness of the work material is thin), it is possible to cause a plurality of the spline teeth or the round teeth to cut into the prepared hole at a time, and the broach can be widely adapted for various work materials.

SUMMARY OF THE INVENTION

However, there is room for improvement in the broach of the related art by increasing the machining accuracy of the cutting.

That is, in the broach of Japanese Patent No. 3377713, misregistration (center shift) occurs at the cutting section of the cutting edges of the shell section in relation to the section of the work material to be cut by the cutting edges of the broach body due to the influence of a clearance or the like that is provided to attach the shell section to the broach body; thus, it is difficult to secure machining accuracy.

In particular, in the case of a broach with rear round teeth, it is difficult to secure the machining accuracy of the round teeth group that is formed at the rear side of the tool feed direction, and the problems described above easily become apparent.

On the other hand, for example, in an internal gear, the inner circumferential machined portion, which is generally cut using the round teeth group, is a part that does not actually function in the device. Therefore, in the related art, there is little demand for accuracy in the machining of the inner circumference in comparison with grooving accuracy, and even for those skilled in the art, the problems described above had not been clearly identified. After clearly identifying the problems described above, the inventor of the present invention created the invention in order to secure high quality machining accuracy in relation to the machining of the inner circumference while maintaining the grooving accuracy.

The present invention takes the above issues into consideration, and an object is to provide a broach that is capable of sufficiently increasing the machining accuracy of cutting.

In order to solve the problems and attain the above-described object, the present invention adopts the following means.

That is, the broach of the present invention is provided with a shaft-shaped broach body and a plurality of cutting edges that are arranged on an outer circumference of the broach body spaced apart at intervals in the axial direction of the broach body. The broach body is inserted into a prepared hole that is formed in the work material facing a tool feed direction along the axial direction. At this tune, the plurality of cutting edges groove the prepared hole and machine the inner circumference of the prepared hole, thereby cutting the prepared hole into a predetermined shape. The plurality of cutting edges are provided with a spline teeth group, which contains a plurality of spline teeth that groove the prepared hole, and a round teeth group, which is disposed in a different position from the spline teeth group along the axial direction and contains a plurality of round teeth that machine the inner circumference of the prepared hole. At least one gullet is formed to extend along the outer circumference of the broach body in the circumferential direction around an axis between the round teeth that are adjacent to one another in the axial direction in the round teeth group. The gullet extends toward the axial direction, gradually twisting toward the circumferential direction. The spline teeth group and the round teeth group are formed integrally on the outer circumference of the broach body.

With the broach of the present invention, the round teeth group is disposed in a different position in the axial direction from the spline teeth group. Therefore, even when, for example, cutting a work material with a short length along the axial direction (that is, the thickness of the work material is thin and the cut length is short), it is possible to cause the spline teeth or the round teeth to cut into a prepared hole a plurality at a time. Accordingly, since it is possible to stabilize the relative positions of the broach and the work material in the radial direction, the broach can be widely adapted for various work materials.

According to the broach of the present invention, the gullet of the round teeth group extends toward the axial direction, gradually twisting toward the circumferential direction, thereby the round teeth also form a spiral shape; thus, even when cutting the work material with a short cut length, as described above, it is possible to achieve a state in which a substantially fixed number (amount) of the round teeth always cut into the prepared hole of the work material and it is possible to suppress center shift during machining of the inner circumference.

Since the round teeth continually cut into a prepared hole of the work material to orbit the axis, it is possible to reduce the cutting load (the shock) during cutting, it is also possible to suppress fluctuation in the cutting load, and, it is possible to sufficiently increase the machining accuracy of the machining of the inner circumference.

For example, when, unlike in the present invention, each gullet of the round teeth group forms a ring shape that extends along the circumferential direction (when the gullet is not twisted and is of an axially-perpendicular gullet type), the number of round teeth that cut into the prepared hole of the work material is not fixed. Additionally, the round teeth intermittently cut into the entire circumferential direction of the prepared hole of the work material. Therefore, the fluctuation in the cutting load increases, center shift occurs more easily and it is difficult to secure accuracy in the machining of the inner circumference.

Furthermore, in the present invention, the spline teeth group and the round teeth group are both formed integrally on the outer circumference of the broach body. Therefore, center shift does not occur easily between a part of the work material that is cut by the spline teeth group or the round teeth group and a part that is cut by the subsequent round teeth group or the spline teeth group; thus, the machining quality can be sufficiently increased.

The manufacture of the broach also becomes easy due to the spline teeth group and the round teeth group being formed integrally. In other words, since it is not necessary to create a shell section separately from the broach body, it is possible to reduce the number of parts and it is also possible to reduce the number of manufacturing processes. Additionally, by setting the gullet of the spline teeth group and the gullet of the round teeth group to both be of the off-normal type, for example, it is possible to further simplify the manufacturing.

In this manner, according to the present invention, it is possible to secure high machining accuracy, not only for the grooving, but also for the machining of the inner circumference; thus, the broach can be adapted for the demands of various products.

In the description given above, a case is described in which a work material with a short cut length is used, in particular; however, the same effect can also be obtained in the cutting of a work material with a long cut length.

In the broach of the present invention, the round teeth group may be disposed closer to the rear in the tool feed direction than the spline teeth group.

According to the configuration of the broach, it is possible to dispose the round teeth group on the rear-end section in the forming region of the cutting edges of the broach body. That is, for example, when cutting a prepared hole of the work material into an internal gear shape, of the circumference cutting teeth group (a first spline teeth group that cuts into the prepared hole in the tooth height direction (the outside in the radial direction)) and the tooth thickness cutting teeth group (a second spline teeth group that is positioned on the rear of the circumference cutting teeth group and cuts in the tooth thickness direction (the circumferential direction)) that are provided in the spline teeth group, it is possible to dispose the round teeth group in close proximity to the rear of the tooth thickness cutting teeth group. In this case, it is possible to secure high-accuracy concentricity between the post-machining internal gear-shaped tooth faces (the faces that face the circumferential direction in the grooved portion) and the smaller-diameter portion (the inner circumferential machined portion).

In the broach of the present invention, the spline teeth group may be disposed on the front and the rear, respectively, in the tool feed direction of the round teeth group.

According to the configuration of the broach, for example, when cutting the prepared hole of the work material into an internal gear shape, it is possible to dispose the round teeth group between the circumference cutting teeth group (the first spline teeth group) and the tooth thickness cutting teeth group (the second spline teeth group) that are provided in the spline teeth group. In this case, since it is possible to dispose the round teeth group in close proximity to the rear of the circumference cutting teeth group, it is possible to secure high-accuracy concentricity between the post-machining internal gear-shaped larger-diameter portion (the groove bottom face positioned closest to the outside in the radial direction in the grooved portion) and the smaller-diameter portion (the inner circumferential machined portion).

In the broach of the present invention, the round teeth group may be disposed closer to the front in the tool feed direction than the spline teeth group.

According to the configuration of the broach, it is possible to dispose the round teeth group on the front-end section in the forming region of the cutting edges of the broach body. Therefore, when the manufacturing of the broach is difficult, for example, when the tooth groove width of the spline teeth is narrow and a prepared hole of the work material is machined into an internal gear shape, the configuration is useful for facilitating the manufacturing the broach. As in the configuration of the present invention described above, the internal diameter of the prepared hole is increased in size by disposing the round teeth group closer to the front than the spline teeth group and cutting the smaller-diameter (the inner circumference portion) of the prepared hole first using the round teeth group. If the subsequent spline teeth group is caused to cut into the work material from this state, the tooth groove width of the spline teeth is widened and the manufacturing of the broach is simplified.

According to the broach of the present invention, it is possible to sufficiently increase the machining accuracy of the cutting.

DETAILED DESCRIPTION OF THE INVENTION

Hereinafter, description will be given of a broach 1 according to an embodiment of the present invention, referring to the drawings.

Figure 2:
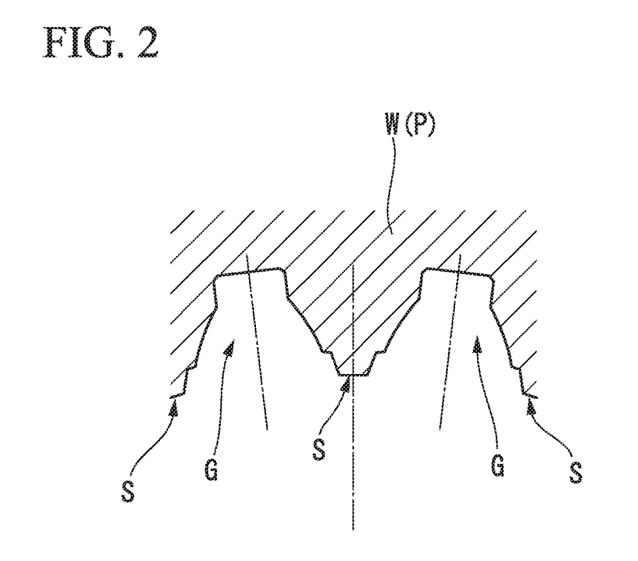
FIG. 2 is a cross sectional view showing a portion of the work material that is machined using the broach of FIG. 1.

The broach 1 of the present embodiment is a broach with rear round teeth, which subjects a prepared hole that is formed in a work material in advance to grooving and machining of the inner circumference, in order, to form the prepared hole in an internal gear shape (a predetermined shape). Specifically, the broach 1 is a helical broach, and as shown in FIG. 2, the broach 1 broaches a work material W that will become a product such as a helical internal gear P having a twisted groove G at the inner circumference thereof. An example of the helical internal gear P is a planetary internal gear for an automatic transmission.

Figure 1:
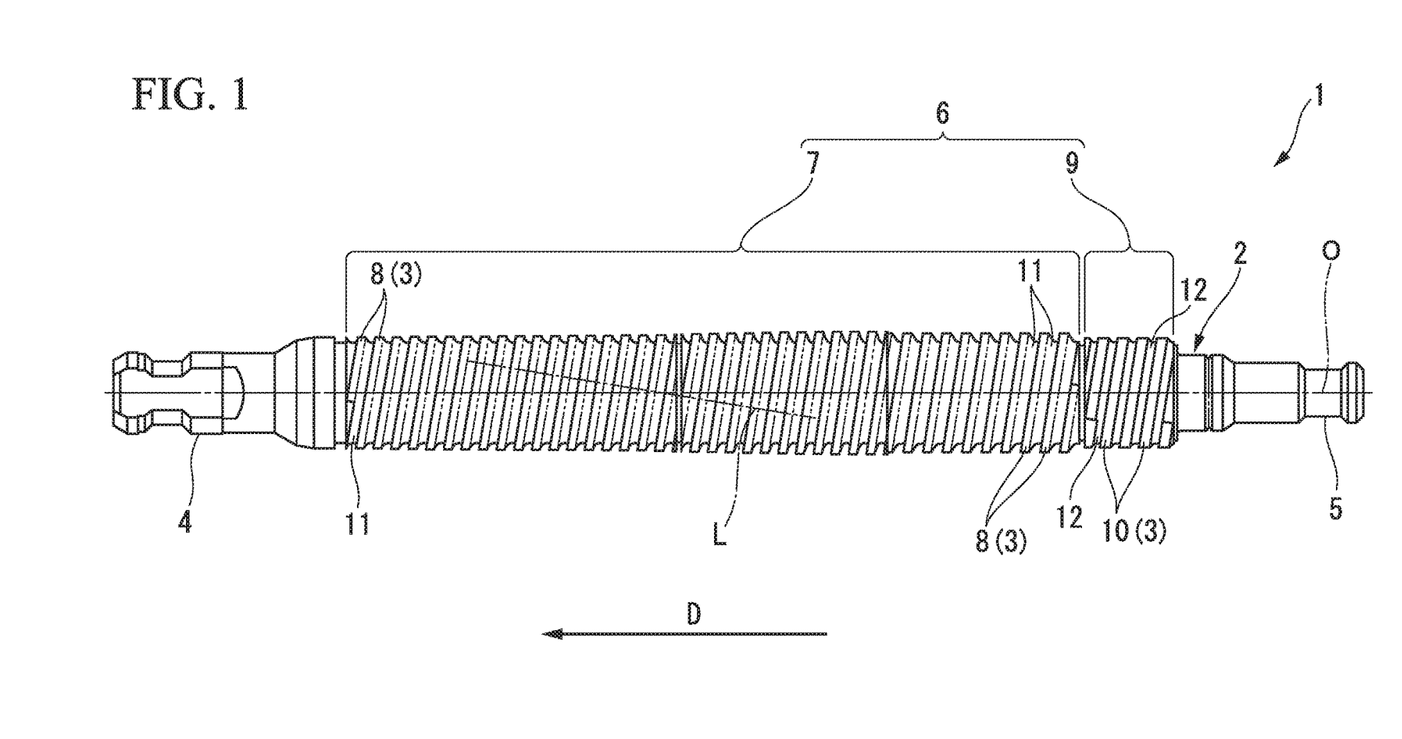
FIG. 1 is a side view showing a broach according to an embodiment of the present invention.

As shown in FIG. 1, the broach 1 is provided with a shaft-shaped broach body 2 and a plurality of cutting edges 3 that are arranged around the outer circumference of the broach body 2 spaced apart at intervals in an axis O direction of the broach body 2. The broach body 2 is inserted into a prepared hole that is formed in the work material W facing a tool feed direction D along the axis O direction. At this time, the broach body 2 is caused to move and the plurality of cutting edges 3 groove the prepared hole or machine the inner circumference of the prepared hole, thereby cutting the prepared hole into an internal gear shape.

The broach body 2 is inserted into the prepared hole such that the axis O becomes the same axis as the central axis of the prepared hole of the work material W. In the present specification, of the axis O directions of the broach body 2, an orientation in which the broach body 2 is transported in relation to the work material W (the left side in FIG. 1) is referred to as a tool feed direction D (or the front in the tool feed direction D) and an orientation facing the opposite side (the right side in FIG. 1) is referred to as the rear in the tool feed direction D. A direction that is perpendicular to the axis O is referred to as a radial direction, and a direction that orbits the axis O is referred to as a circumferential direction.

Specifically, the broach body 2 is a lengthy shaft shape with the axis O as a center. Grips 4 and 5 are respectively formed on both end parts of the broach body 2. A cutting edge section 6 is formed between the grips 4 and 5. The plurality of cutting edges 3 are provided on the outer circumference of the broach body 2 in the cutting edge section 6 so as to protrude toward the outside in the radial direction. Of the cutting edges 3, spline teeth 8, which are described hereinafter, are arranged to form a spiral shape along a lead L that twists around the axis O from the tip-end side (the left side in FIG. 1) toward the rear-end side (the right side in FIG. 1) of the broach body 2. Plural rows of the spline teeth 8 are formed spaced apart at intervals in the circumferential direction.

The plurality of cutting edges 3 are provided with a spline teeth group 7, which contains the plurality of spline teeth 8 that groove the prepared hole of the work material W, and a round teeth group 9, which is disposed in a different position from the spline teeth group 7 along the axis O direction and contains a plurality of round teeth 10 that machine the inner circumference of the prepared hole. The broach 1 of the present embodiment is a broach with rear round teeth and the round teeth group 9 is disposed closer to the rear in the tool feed direction D than the spline teeth group 7. Specifically, in the example shown in FIG. 1, the round teeth group 9 is disposed on the rear-end section in the tool feed direction D in the cutting edge section 6, and the spline teeth group 7 is disposed on a part other than the rear-end section.

The spline teeth group 7 and the round teeth group 9 are formed integrally on the outer circumference of the broach body 2. In other words, in the present embodiment, a shell section is not attached to the broach body 2 and all of the plurality of cutting edges 3 are formed integrally on the outer circumference of the broach body 2.

Figure 3:
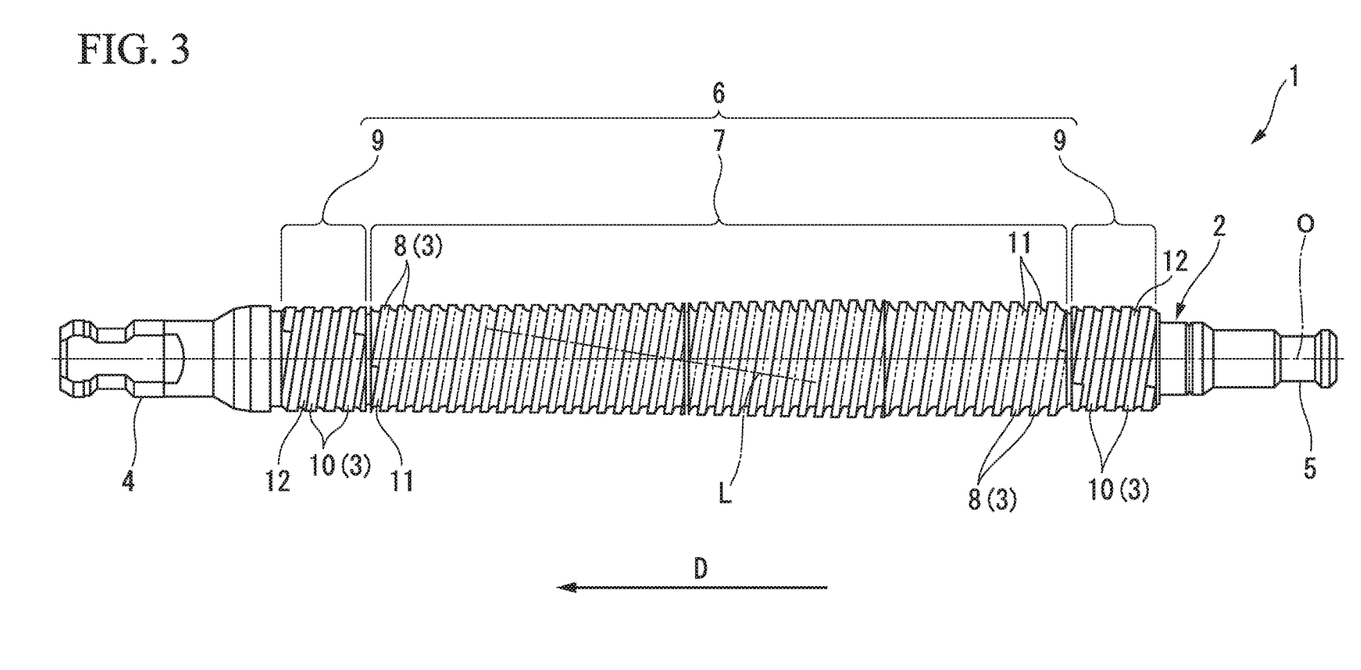
FIG. 3 is a side view showing a broach according to a second embodiment of the present invention.
Figure 4:
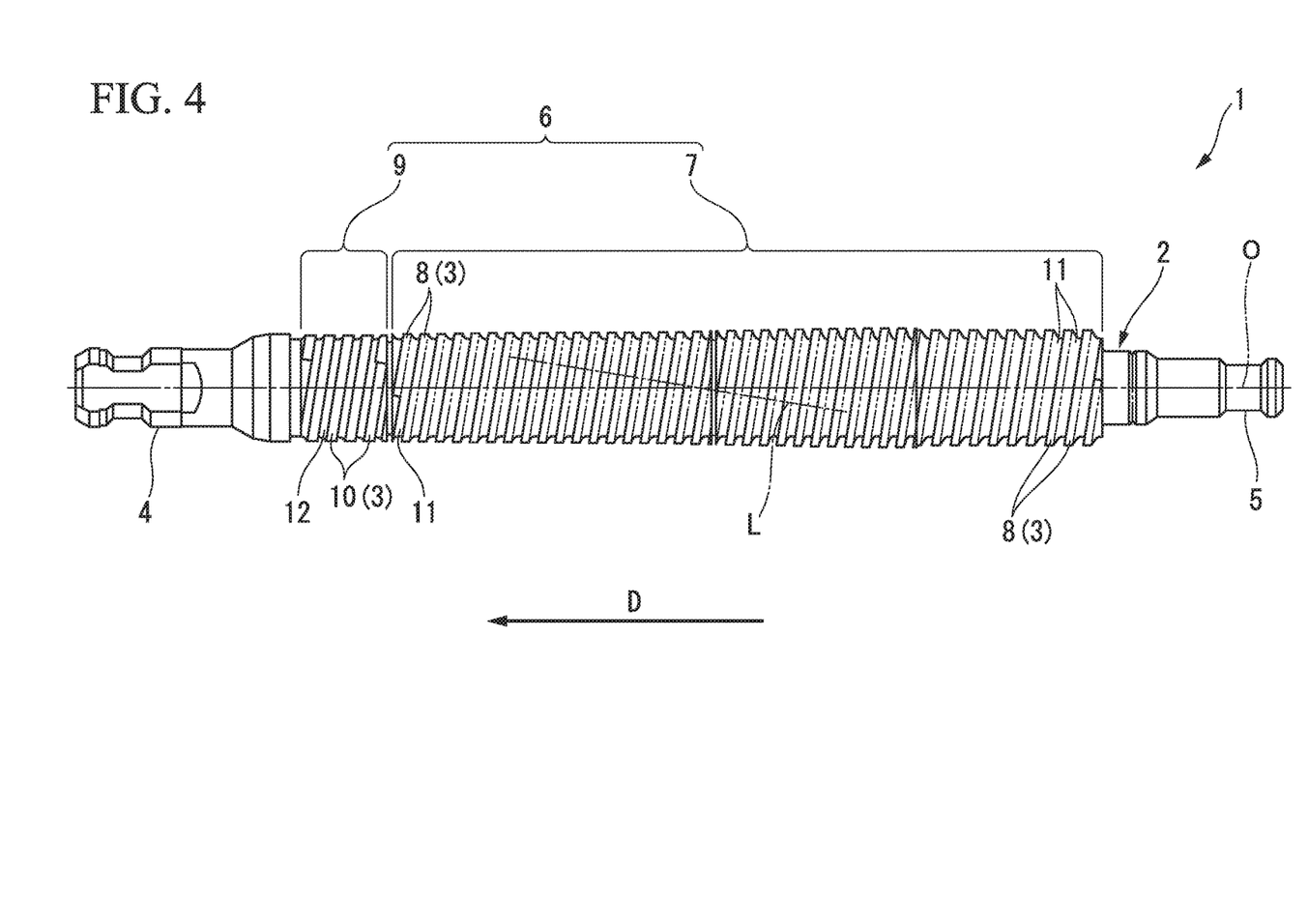
FIG. 4 is a side view showing a broach according to a third embodiment of the present invention.

In a part of the cutting edge section 6 on which the spline teeth group 7 is disposed, as seen in FIGS. 1, 3 and 4, the plurality of spline teeth 8 (the cutting edges 3) that are provided on the front region in the tool feed direction D are the circumference cutting teeth that cut the tooth profile of the helical internal gear P in a tooth height direction (the radial direction). In the circumference cutting teeth, the tooth height of the cutting edges 3 is gradually increased along the rows of cutting edges 3 toward the rear in the tool feed direction D.

In the region of the cutting edge section 6 in which the spline teeth group 7 is disposed, the plurality of spline teeth 8 (the cutting edges 3) that are provided closer to the rear in the tool feed direction D than the circumference cutting teeth are the tooth thickness cutting teeth, which form a predetermined tooth thickness by chase cutting, in the tooth thickness direction (the circumferential direction), the tooth faces of the tooth profiles that are cut to a predetermined tooth height using the above-described circumference cutting teeth, that is, both inside faces of the twisted groove G of the work material W.

In other words, the spline teeth group 7 of the present embodiment contains a circumference cutting teeth group (a first spline teeth group) formed from a plurality of circumference cutting teeth, and a tooth thickness cutting teeth group (a second spline teeth group) that is disposed closer to the rear in the tool feed direction D than the circumference cutting teeth group and formed from a plurality of tooth thickness cutting teeth.

At least one gullet 11 is formed to extend along the outer circumference of the broach body 2 in the circumferential direction between the spline teeth 8 that are arranged in rows of cutting edges adjacent to one another in the axis O direction in the spline teeth group 7. The gullet 11 extends toward the axis O direction, gradually twisting toward the circumferential direction. In other words, the gullet 11 of the spline teeth group 7 is an off-normal type of twisted gullet.

A plurality of the round teeth 10, which are cylindrically shaped when viewed from the axis O direction, are formed in the round teeth group 9 of the cutting edge section 6 spaced apart at intervals in the axis O direction. Specifically, at least one gullet 12 is formed to extend along the outer circumference of the broach body 2 in the circumferential direction between the round teeth 10 that are adjacent to one another in the axis O direction in the round teeth group 9. The gullet 12 extends toward the axis O direction, gradually twisting toward the circumferential direction. In other words, the gullet 12 of the round teeth group 9 is off-normal type of twisted gullets.

According to this configuration, the plurality of round teeth 10 are integrally formed in the same manner as a single spiral-shaped rib that is provided to extend twisting on the outer circumference of the broach body 2. The gullet 12 is also integrally formed in the same manner as a single spiral-shaped groove.

Note that in the example shown in FIGS. 1, 3 and 4 the twist angle of the gullet 11 in the spline teeth group 7 and the twist angle of the gullet 12 in the round teeth group 9 are set to be equal to one another.

In the broach 1 of the present embodiment described above, the broach body 2 is inserted into a prepared hole of the work material W and transported in the tool feed direction D; thereby, in FIG. 2, the prepared hole is subjected to grooving (machining of an internal gear-shaped tooth section) of the twisted groove G using the spline teeth group 7. Subsequently, the round teeth group 9 machines the inner circumference (machines the internal gear-shaped smaller-diameter section) of the inner circumference face S that has the smallest diameter.

With the broach 1 of the present embodiment, the round teeth group 9 is disposed in a different position in the axis O direction from the spline teeth group 7. Therefore, even when, for example, cutting the work material W with a short length along the axis O direction (that is, the thickness of the work material is thin and the cut length is short), it is possible to cause the spline teeth 8 or the round teeth 10 to cut into a prepared hole a plurality at a time. Accordingly, since it is possible to stabilize the relative positions of the broach 1 and the work material W in the radial direction, the broach can be widely adapted for various work materials W.

According to the broach 1 of the present embodiment, the gullet 12 of the round teeth group 9 extends toward the axis O direction, gradually twisting toward the circumferential direction, thereby the round teeth 10 also form a spiral shape; thus, even when cutting the work material W with a short cut length, as described above, it is possible to achieve a state in which a substantially fixed number (amount) of the round teeth 10 always cut into the prepared hole of the work material W and it is possible to suppress center shift during machining (machining of the inner circumference) of the inner circumference face S.

Since the round teeth 10 continually cut into a prepared hole of the work material W to orbit the axis O, it is possible to reduce the cutting load (the shock) during cutting, it is also possible to suppress fluctuation in the cutting load, and, it is possible to sufficiently increase the machining accuracy of the machining of the inner circumference.

Specifically, when, unlike in the present embodiment, each of the gullets of the round teeth group forms a ring shape that extends along the circumferential direction (when the gullet is not twisted and is of an axially-perpendicular gullet type), for example, the number of round teeth that cut into the prepared hole of the work material is not fixed. Additionally, the round teeth intermittently cut into the entire circumferential direction of the prepared hole of the work material. Therefore, the fluctuation in the cutting load increases, center shift occurs more easily and it is difficult to secure accuracy in the machining of the inner circumference.

Furthermore, in the present embodiment, the spline teeth group 7 and the round teeth group 9 are both formed integrally on the outer circumference of the broach body 2. Therefore, center shift does not occur easily between a part of the work material W that is cut by the spline teeth group 7 and a part that is cut by the round teeth group 9; thus, the machining quality can be sufficiently increased.

The manufacture of the broach 1 also becomes easy due to the spline teeth group 7 and the round teeth group 9 being formed integrally. In other words, since it is not necessary to create a shell section separately from the broach body 2, it is possible to reduce the number of parts and it is also possible to reduce the number of manufacturing processes. Additionally, as described in the present embodiment, by setting the gullet 11 of the spline teeth group 7 and the gullet 12 of the round teeth group 9 to both be of the off-normal type, it is possible to further simplify manufacturing.

In this manner, according to the present embodiment, it is possible to secure high machining accuracy, not only for the machining of the twisted groove G (the grooving), but also for the machining of the inner circumference face S (the machining of the inner circumference); thus, the broach can be adapted for the demands of various products.

In the description given above, a case is described in which the work material W with a short cut length is used, in particular; however, the same effect can also be obtained in the cutting of the work material W with a long cut length.

In the broach 1 of the present embodiment, the round teeth group 9 is disposed closer to the rear in the tool feed direction D than the spline teeth group 7. Specifically, the broach 1 is a broach with rear round teeth, in which the round teeth group 9 is disposed on the rear-end section in the forming region (the cutting edge section 6) of the cutting edges 3 of the broach body 2. Accordingly, as described in the present embodiment, when cutting a prepared hole of the work material W into an internal gear shape, of the circumference cutting teeth group (the first spline teeth group that cuts into the prepared hole in the tooth height direction (the outside in the radial direction)) and the tooth thickness cutting teeth group (the second spline teeth group that is positioned on the rear of the circumference cutting teeth group and cuts in the tooth thickness direction (the circumferential direction)) that are provided in the spline teeth group 7, it is possible to dispose the round teeth group 9 in close proximity to the rear of the tooth thickness cutting teeth group. Accordingly, it is possible to secure high-accuracy concentricity between the post-machining internal gear-shaped tooth faces (the faces that face the circumferential direction in the grooved portion (the twisted groove G)) and the smaller-diameter portion (the inner circumferential machined portion (the inner circumference face S)).

The present invention is not limited to the embodiment described above and may be changed in various ways insofar as they are within the scope of the invention.

For example, in the embodiment described above, a configuration is described in which the round teeth group 9 is disposed closer to the rear in the tool feed direction D than the spline teeth group 7; however, the invention is not limited thereto.

In other words, the spline teeth group 7 may be disposed on the front and the rear, respectively, in the tool feed direction D of the round teeth group 9. That is, the broach 1 may be a broach with intermediate round teeth.

According to the configuration, for example, when cutting the prepared hole of the work material W into an internal gear shape, it is possible to dispose the round teeth group 9 between the circumference cutting teeth group (the first spline teeth group) and the tooth thickness cutting teeth group (the second spline teeth group) that are provided in the spline teeth group 7. In this case, since it is possible to dispose the round teeth group 9 in close proximity to the rear of the circumference cutting teeth group, it is possible to secure high-accuracy concentricity between the post-machining internal gear-shaped larger-diameter (the groove bottom face positioned closest to the outside in the radial direction in the grooved portion (the twisted groove G)) and the smaller-diameter (the inner circumferential machined portion (the inner circumference face S)).

The round teeth group 9 may be disposed closer to the front in the tool feed direction D than the spline teeth group 7 (see FIGS. 3 and 4). That is, the broach may be a broach with front round teeth.

According to the configuration, it is possible to dispose the round teeth group 9 on the front-end section in the forming region (the cutting edge section 6) of the cutting edges 3 of the broach body 2, when cutting the prepared hole of the work material W into an internal gear shape. Therefore, for example, the configuration is useful when the tooth groove width of the spline teeth 8 is narrow and the manufacturing of the broach 1 is difficult. As in the configuration described above, the internal diameter of the prepared hole is increased in size by disposing the round teeth group 9 closer to the front than the spline teeth group 7 and cutting the smaller-diameter (the inner circumference portion (the inner circumference face S)) of the prepared hole first using the round teeth group 9. If the subsequent spline teeth group 7 is caused to cut into the work material from this state, the tooth groove width of the spline teeth 8 is widened and the manufacturing of the broach 1 is simplified.

A configuration is adopted in which the circumference cutting teeth and the tooth thickness cutting teeth are provided in the spline teeth 8 of the spline teeth group 7; however, the invention is not limited thereto. In other words, the plurality of spline teeth 8 may be configured such that the protrusion amount toward the outside in the radial direction thereof and the width in the circumferential direction gradually increase from the front to the rear in the tool feed direction D.

A configuration is adopted in which the twist angle of the gullet 11 of the spline teeth group 7 and the twist angle of the gullet 12 of the round teeth group 9 are set to be equal to one another; however, the invention is not limited thereto, and a configuration may be adopted in which the twist angle of the gullet 11 of the spline teeth group 7 and the twist angle of the gullet 12 of the round teeth group 9 are set to differ from one another.

A configuration may be adopted in which, in the broach body 2, a front section guide is provided between the grip 4 and the cutting edge section 6 and a rear section guide is provided between the grip 5 and the cutting edge section 6.

Note that the front section guide is provided in order to accurately position and guide the cutting edges 3 (the spline teeth 8), which cut into the work material W first and are positioned closest to the front in the tool feed direction D, in the radial direction in relation to the prepared hole. The rear section guide is provided in order to position the broach body 2 and the work material W in the radial direction until the completion of the cutting by the cutting edges 3 (the round teeth 10), which cut into the work material W last and are positioned closest to the rear in the tool feed direction D.

In the embodiment described above, a configuration is adopted in which the helical internal gear P is manufactured by cutting the prepared hole of the work material W using the broach 1; however, the invention is not limited thereto. In other words, the broach 1 need only to cut a prepared hole of the work material W into a predetermined shape by grooving or machining the inner circumference. Therefore, there is no problem in the broach cutting the prepared hole into a shape other than the helical internal gear P shape described above, for example, a serrated shape or a keyway shape.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A broach comprising:
a shaft-shaped broach body; and
a plurality of cutting edges that are arranged on an outer circumference of the broach body spaced apart at intervals in an axial direction of the broach body, configured for insertion into a prepared hole formed in a work material facing a tool feed direction along the axial direction, and configured to groove an inner circumference of the prepared hole, thereby cutting the prepared hole into a predetermined shape, wherein
the plurality of cutting edges include a plurality of spline teeth formed as a group of spline teeth that groove the prepared hole, and a plurality of round teeth axially offset, as a group of round teeth, from and radially recessed relative to the group of spline teeth that machine the inner circumference of the prepared hole,
at least one first gullet is formed to extend along the outer circumference of the broach body in the circumferential direction around an axis of the broach body between the respective round teeth that are adjacent to one another within the group of round teeth in the axial direction,
the first gullet extends helically about the broach body along the axial direction, gradually twisting toward the circumferential direction in a spiral shape,
the group of spline teeth and the group of round teeth are each formed integrally on the outer circumference of the broach body at different positions relative to each other,
a second gullet formed between the spline teeth to extend helically about the broach body along the outer circumference of the broach body in the circumferential direction around the axis of the broach body, and
the second gullet having a twist angle which is equal to a twist angle of the first gullet between the round teeth, and a twist direction of the second gullet being equal to a twist direction of the first gullet.

2. The broach according to claim 1, wherein the group of round teeth are disposed closer to a rear side of the broach relative to the tool feed direction than the group of spline teeth.

3. The broach according to claim 1, further comprising a second group of round teeth, wherein the group of spline teeth are axially offset from the group of round teeth and the second group of round teeth disposed on opposite sides of the group of spline teeth.

4. The broach according to claim 1, wherein the group of round teeth are disposed as a group closer to a front side of the broach relative to the tool feed direction than the group of spline teeth.

5. The broach according to claim 1, wherein
the group of spline teeth include circumference cutting teeth provided on a front region in the tool feed direction and tooth thickness cutting teeth provided on a rear region in the tool feed direction,
the circumference cutting teeth are configured to cut a tooth profile of a helical internal gear in a tooth height direction, and tooth heights of the circumference cutting teeth are gradually increased toward the rear region, and
the tooth thickness cutting teeth are configured to cut both inside faces of the tooth profile so as to form a tooth thickness by chase cutting.

* * * * *